United States Patent [19]

O'Rourke

[11] 3,726,438
[45] Apr. 10, 1973

[54] APPARATUS FOR DISPENSING MATERIAL FROM RECEPTACLES PIVOTALLY INVERTABLE AT THE ENDS OF CONSECUTIVE TIME PERIODS

[76] Inventor: William J. O'Rourke, 27 Palmyra Road, R.F.D. 3, Brewster, N.Y. 10509

[22] Filed: Sept. 8, 1971

[21] Appl. No.: 178,687

[52] U.S. Cl. ................................ 222/70, 119/51.13
[51] Int. Cl. .................................................. A01k 5/02
[58] Field of Search ...................... 222/70, 166, 167, 222/169, 170, 16 H; 221/86; 119/51.11, 51.13; 134/93

[56] References Cited

UNITED STATES PATENTS

| | | | |
|---|---|---|---|
| 3,646,913 | 3/1972 | Jenkins | 222/70 X |
| 1,214,881 | 2/1917 | Berntzen | 119/51.13 X |
| 1,880,956 | 10/1932 | Farmer | 221/86 |

*Primary Examiner*—Robert B. Reeves
*Assistant Examiner*—Thomas E. Kocovsky
*Attorney*—John R. Flanagan

[57] ABSTRACT

An apparatus for dispensing a predetermined quantity of material at the end of consecutive preselected time periods has a plurality of receptacles, each for containing a predetermined quantity of material, pivotally invertably mounted at equal distances around the periphery of a rotatable turret mechanism. The turret mechanism turns through a rotation cycle having a predetermined period of rotation and thereby carries the receptacles along a fixed path of revolution. A trip rod prepositioned adjacent to a preselected segment of the receptacle path initiates pivotal tilting of each receptacle as each receptacle is consecutively carried through the path segment near the end of each consecutive preselected time period. After initiation of this pivotal tilting movement of the receptacle, a weight attached to the receptacle causes acceleration of the tilting movement to invert the receptacle at the end of the preselected path segment whereby the predetermined quantity of material is dispensed from a receptacle at the end of each consecutive preselected time period.

12 Claims, 7 Drawing Figures

INVENTOR.
WILLIAM J. O'ROURKE

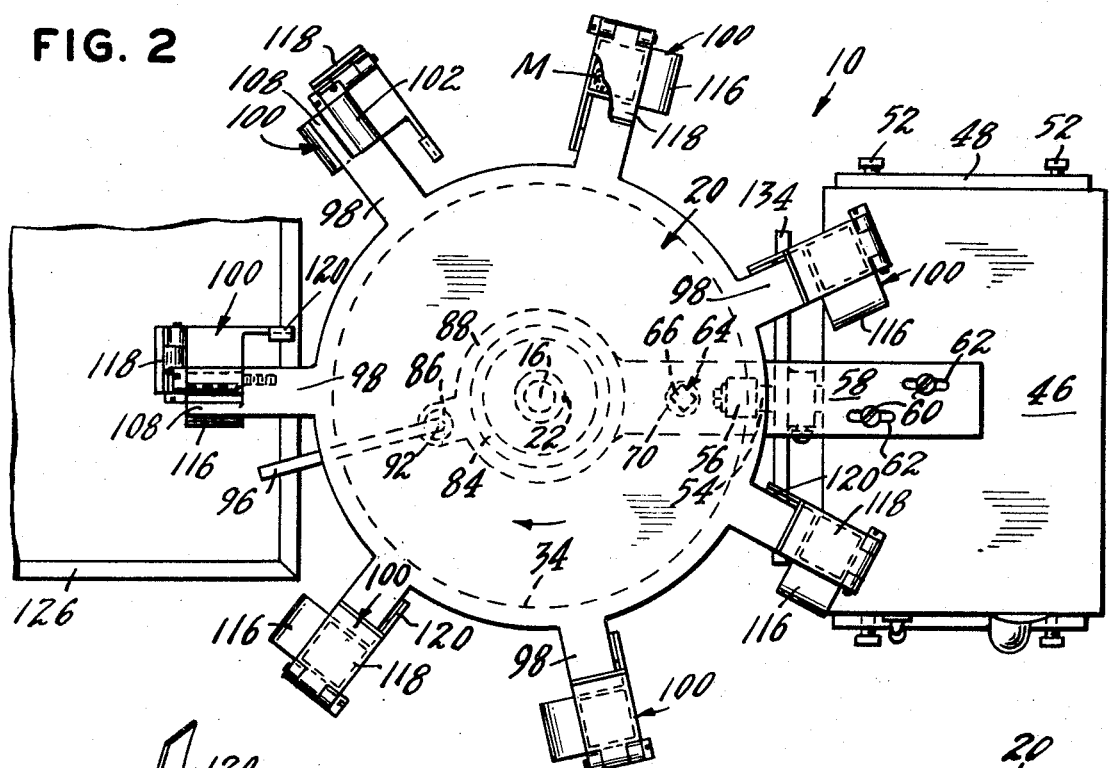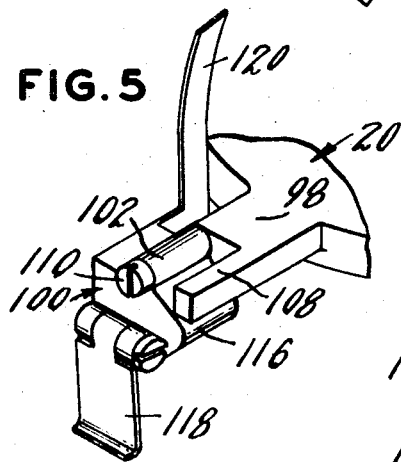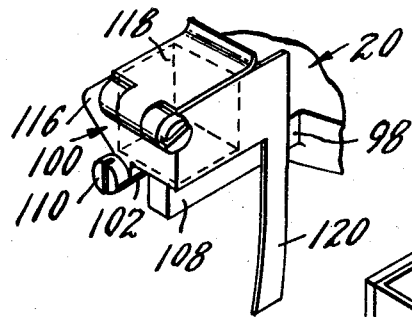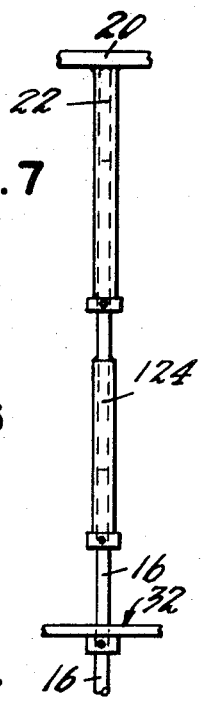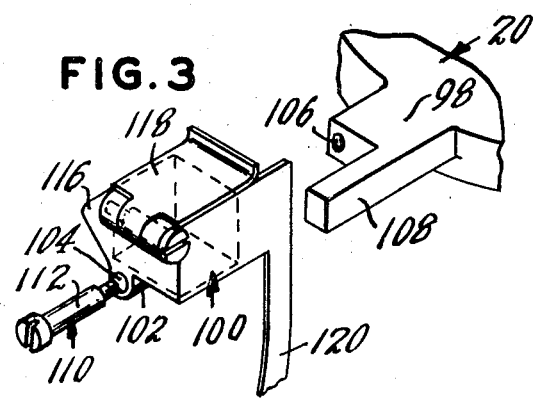
INVENTOR.
WILLIAM J. O'ROURKE
BY John R. Flanagan
ATTORNEY 3,726,438

APPARATUS FOR DISPENSING MATERIAL FROM RECEPTACLES PIVOTALLY INVERTABLE AT THE ENDS OF CONSECUTIVE TIME PERIODS

BACKGROUND OF THE INVENTION

The present invention relates broadly to dispensing apparatus and is more particularly concerned with a novel apparatus for dispensing a predetermined quantity of material at the end of consecutive preselected time periods.

It is quite common today to find in the average household one or more of an assortment of small animals which are being kept as pets by members of the household in artificially-created habitats. These habitats often may take the form of a caged enclosure or a tank depending on the particular animal. It is essential for the long-term health and survival of the particular animal that the artificially-created habitat resemble as near as possible the natural environment of that animal. Therefore, it is essential that the animal has available a source of fresh, uncontaminated food materials at regular time intervals which correspond to the natural physiological time cycle of its appetite.

However, frequently it is difficult for the average pet owner to continually devote regular daily attention to the food requirements of his pet animals. Therefore, unless the pet owner can find someone to assume his responsibility in regard to feeding his pet at regular intervals during his absence, the long-term health and survival of the pet will be seriously impaired by the inattention on the part of the pet owner.

The present invention releases the pet owner from the burden of maintaining regular daily attention to the food requirements of his pet by providing an apparatus which automatically dispenses a desired predetermined quantity of food material at the end of consecutive preselected time periods directly into the habitat of the pet. The time periods may be preselected fractions of a day, a week or more depending on the particular physiological cycle of the pet's appetite.

The apparatus of the present invention is particularly suited for providing a predetermined quantity of food material to pets such as fishes which are captively contained in a water-filled tank in the household. The apparatus is capable of dispensing the quantity of fresh, uncontaminated food material required daily by the fishes into the water-filled tank at the same time each day for several days without any service activity being required on the part of the fish owner.

SUMMARY OF THE INVENTION

The present invention relates to an apparatus for dispensing a predetermined quantity of material at the end of a preselected time period having at least one receptacle for containing a predetermined quantity of material and capable of being pivotally moved in order to dispense that predetermined quantity of material, and a rotatable member for carrying the receptacle along a fixed path of travel, with the receptacle being pivotally mounted on the rotatable member. Further, the apparatus has drive means for rotating the rotatable member through at least that portion of one rotation cycle which corresponds to the preselected time period and means for pivotally moving the receptacle to dispense the predetermined quantity of material from the receptacle at the end of the preselected time period, simultaneously as the receptacle is carried along a segment of its fixed path of travel by the rotatable member.

BRIEF DESCRIPTION OF THE DRAWINGS

FIG. 2 is a top plan view of the apparatus of FIG. 1;

FIG. 3 is an enlarged fragmentary view of the turret shown in FIGS. 1 and 2 illustrating the preferred embodiment of the receptacle before being pivotally mounted on the turret;

FIG. 4 is an enlarged fragmentary view of the turret shown in FIGS. 1 and 2 illustrating the receptacle pivotally mounted on the turret and carried in its upright position.

FIG. 5 is an enlarged fragmentary view of the turret shown in FIGS. 1 and 2 illustrating the receptacle pivotally mounted on the turret and carried in its inverted position;

FIG. 6 is an alternative embodiment of the receptacle showing a receptacle with a capacity that is about threefold that of the preferred embodiment; and FIG. 7 is an alternative embodiment of the apparatus of FIGS. 1 and 2 showing extension means for increasing the height of the apparatus.

DETAILED DESCRIPTION OF THE INVENTION

Figure 1:
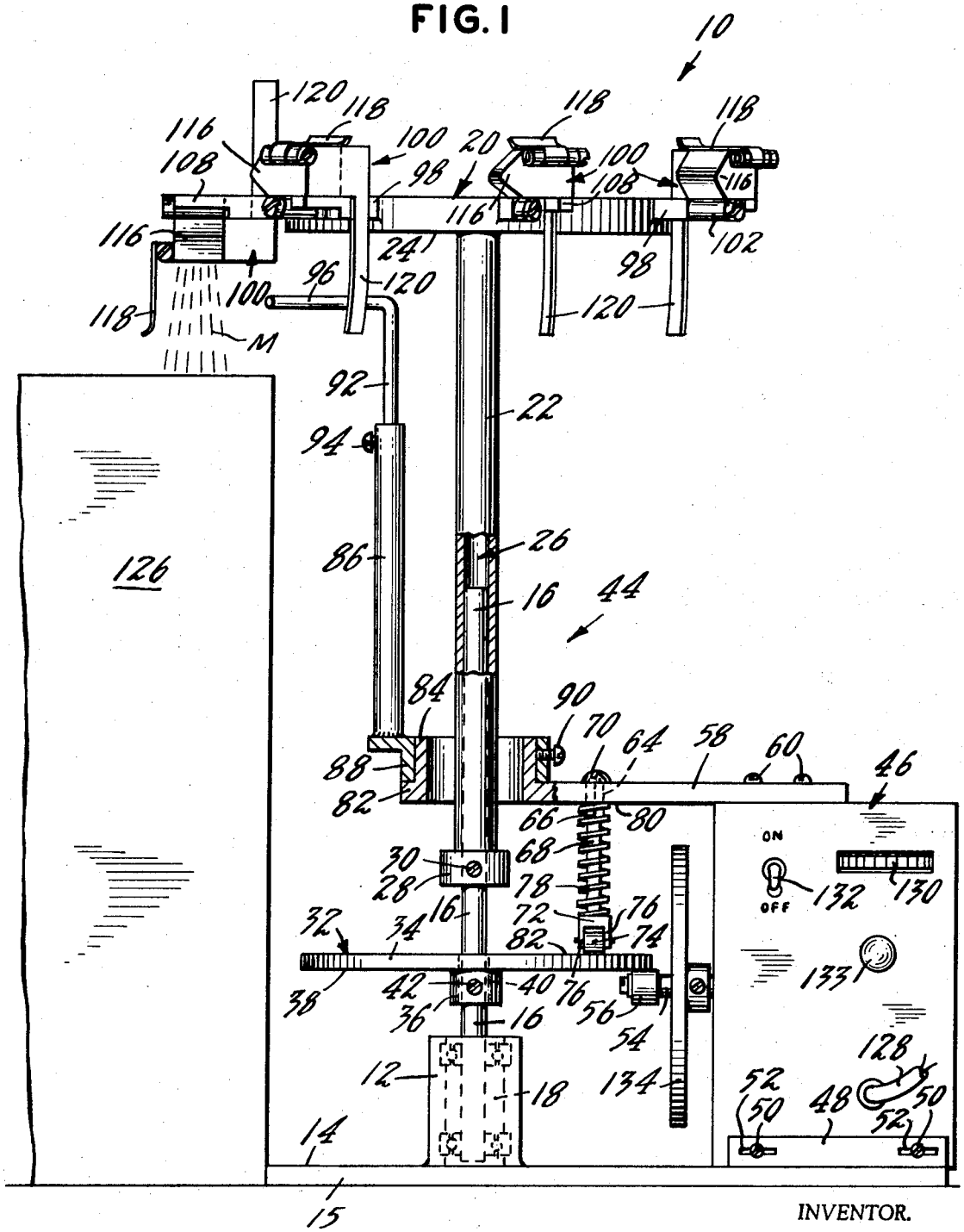
Fig. 1 is an elevational view partially in section illustrating the apparatus of the present invention.

As a preferred or exemplary embodiment of the instant invention, FIGS. 1 and 2 illustrate an apparatus, generally designated 10, for dispensing a predetermined quantity of material M at the end of consecutive preselected time periods.

A bearing housing 12 is integrally formed with, welded to, or otherwise secured to, the upper surface 14 of a base plate 15 of the dispensing apparatus 10. A vertical shaft 16 is rotatably supported within a central bore 18 of the bearing housing 12.

A horizontal turret 20 is supported on a vertical column 22 which is integrally formed with, welded to, or otherwise secured to, the lower surface 24 of the turret 20 in concentricity with the central axis of the turret 20. The vertical column 22 has a longitudinal central bore 26 open at the lower end of the column 22. The diameter of the bore 26 is only slightly larger than the diameter of the vertical shaft 16. An annular collar 28 is integrally formed with, welded to, or otherwise secured to, the lower end of the column 22 and has a bore which radially extends outwardly from the longitudinal axis of the column 22 and is threaded to receive a set screw 30.

The vertical column 22 is inserted onto, and mated with, the upper portion of the vertical shaft 16. The screw 30, when firmly set in contact with the shaft 16 holds the column 22 in a desired longitudinal position along the shaft 16 and holds the turret 20 at a desired height above the base plate 15 of the dispensing apparatus 10. Further, the screw 30, when firmly set in contact with the shaft 16, prevents slippage of the column 22 in relation to the shaft 16 during rotational movement of the shaft 16.

A disc element 32 has a circular, planar portion 34 and a collar portion 36 integrally formed with, welded to, or otherwise secured to, the lower surface 38 of the planar portion 34 in concentricity with the central axis of the disc element 32. The disc element 32 has a center bore 40 formed therein which extends through the center of the planar portion 34 and the collar portion 36 of the disc element 32. The diameter of the bore 40 of the disc element 32 is significantly larger than the diameter of the vertical shaft 16, for example, one and one-fifth to one and one-fourth times larger. The collar portion 36 has a bore formed therein which radially extends outwardly from the central axis of the disc element 32 and is threaded to receive a set screw 42.

When the screw 42 is firmly set in contact with the shaft 16, the disc element 32 is carried on the vertical shaft 16 and is immovable in relation to the shaft 16 in the plane of rotation of the shaft 16. Thereby, the shaft 16 and the disc element 32 are rotatable together. However, because the diameter of the bore 40 of the disc element 32 is significantly larger than the diameter of the vertical shaft 16, the disc element 32 is pivotally tiltable in relation to the shaft 16 in all planes that are parallel to the longitudinal axis of the shaft 16 which allows for pivotal movement of the disc element 32 about the axis of the shaft 16, simultaneously as the shaft 16 and the disc element 32 are rotating together.

Therefore, the column 22, the turret 20 supported by the column 22, the shaft 16, and the disc element 32 carried by the shaft 16, in effect, form an unitary rotatable member, generally designated 44, of the dispensing apparatus 10.

A drive mechanism 46 is slideably mounted on a pair of guide brackets 48 (see FIG. 2) which are integrally formed with, welded to, or otherwise secured to, the upper surface 14 of the base plate 15 of the dispensing apparatus 10. The drive mechanism 46 may be slideably adjusted in relation to the pair of guide brackets 48 to any desired location between the limits established by opposite ends of the elongated slots 50 formed in the brackets 48 by first untightening adjustment screws 52, then sliding the drive mechanism 46 to the desired position and finally securely tightening the screws 52 to fasten the drive mechanism 46 to that position.

The drive mechanism 46 includes a rotatable output drive shaft 54 having a longitudinal axis which is substantially perpendicular to the longitudinal axis of the vertical shaft 16 of the rotatable member 44. A drive wheel 56, preferably having a rubber-like material bonded to its cylindrical surface, is fixed in any suitable manner to the outer end of the drive shaft 54. The drive mechanism 46 has been prepositioned in relation to the vertical shaft 16 and the disc element 32 has been prepositioned on the shaft 16 in relation to the drive shaft 54 of the drive mechanism 46 such that the rubberized cylindrical surface of the drive wheel 56 may contact the peripheral margin of the lower surface 38 of the disc element 32. Also, preferably, an annularly-shaped sheet (not shown) of a material having a coarse granular surface is bonded to the lower surface 38 of the disc element 32.

A support arm 58 is slideably mounted on the top of the drive mechanism 46 by means of adjustment screws 60. The support arm 58 may be slideably adjusted in relation to the drive mechanism 46 to any desired location between the limits established by opposite ends of the elongated slots 62 formed in the support arm 58 by first untightening the adjustment screws 60, then sliding the support arm to the desired position and finally securely tightening the screws 60 to fasten the support arm 58 in that position. The support arm 58 extends from the drive mechanism 46 perpendicularly toward the longitudinal axis of the vertical shaft 16 of the rotatable member 44.

The support arm 58 has a square-shaped opening 64 formed therein at a location approximately mid-way between the drive mechanism 46 and the vertical shaft 16. A square-shaped end 66 of a stem element 68 is inserted into the opening 64 of the support arm 58 and held therein by a screw 70. The square shape of the end 66 prevents the stem element 68 from being rotated in relation to the support arm 58. The stem element 68 has a U-shaped frame element 72 slideably mounted thereon. The frame element 72 rotatably mounts a rubber wheel 74 between the legs 76 of the frame element 72. A compression spring 78 is positioned longitudinally about the stem element 68 between the lower surface 80 of the support arm 58 and the frame element 72. The frame element 72 is biased by the compression spring 78 toward the top surface 82 of the disc element 32 such that the rubber wheel 76 rotatably mounted on the frame element 72 makes pressurized contact with the top surface 82 of the disc element 32. In this manner, therefore, the rubber wheel 76 insures pressurized contact between the rubberized-cylindrical surface of the drive wheel 56 and the coarse granular lower surface 38 of the disc element 32. Furthermore, simultaneously as the drive wheel 58 of the drive mechanism rotates, the rubber wheel 76 causes pivotal movement of the disc element 32 about the vertical shaft 16, as well as providing the pressurized rolling frictional contact between the disc element 32 and the drive wheel 58, so as to prevent slippage between the disc element 32 and the rotating drive wheel 58.

An annular shoulder 82 which extends radially outwardly from the lower periphery of an annular sleeve 84 is integrally formed with, welded to, or otherwise secured to, the outer end of the support arm 58. The sleeve 84 is aligned in concentricity with the vertical column 22 and has an inside diameter which is significantly greater than the diameter of the column 22, for example, two to three times larger.

A hollow pedestal 86 is integrally formed with, welded to, or otherwise secured to, the upper peripheral edge of an annular ring 88 which is adjustably rotatably mounted on the annular shoulder 82 in concentricity with the annular sleeve 84 and the vertical column 22. The ring 88 has a bore formed therein which radially extends outwardly from the longitudinal axis of the column 22 and is threaded to receive a set screw 90. The pedestal 86 may be adjustably rotated in relation to the sleeve 84 to a desired angular position and then secured in that position by tightening the set screw 90 firmly in contact with the sleeve 84. The longitudinal axis of the pedestal 86 preferably extends generally parallel to the longitudinal axis of the column 22.

The lower end of a rod 92 is inserted into the hollow pedestal 86 and is held therein by a set screw 94 which is threaded through the pedestal 86 adjacent to its upper open end into firm contact with the rod 92. The rod 92 has an upper portion 96 which is bent approximately 90° in relation to the remaining portion of the rod 92. The rod 92 is preferably rotatably adjusted to the angular position where the bent portion 96 extends radially perpendicular to the longitudinal axis of the column 22.

A plurality of support studs 98 are integrally formed with, welded to, or otherwise secured to, the periphery of the horizontal turret 20 preferably at equal distances around the periphery. Each of the support studs 98 project radially outwardly from the central axis of the turret 20. A plurality of receptacles 100, each for containing the predetermined quantity of material M, are pivotally invertably mounted on the plurality of support studs 98. Thereby, when the turret 20 is rotated, the plurality of receptacles 100 are carried along a substantially circular fixed path of revolution.

An individual receptacle 100 and its associated support stud 98 are illustrated in greater detail in FIGS. 3 through 5.

FIG. 3 illustrates the preferred embodiment of the receptacle 100, before the receptacle 100 has been pivotally mounted on the support stud 98. The receptacle 100 preferably has a square or rectangular box-like form, closed at its bottom end and open at its top end when the receptacle 100 is positioned upright as shown in FIGS. 3 and 4. A cylindrical sleeve 102 is integrally formed with, welded to, or otherwise secured to, one bottom edge of the receptacle 100, offset from the center of gravity of the receptacle 100 and radially extending from the central axis of the turret 20. A longitudinal bore 104 is formed through the sleeve 102.

The support stud 98 of the turret 20 has a threaded bore 106 formed in one end of its outer surface and radially extending from the central axis of the turret 20. Further, the support stud 98 has a protruding element 108 formed on the other end of its outer surface which element 108 radially extends outwardly from the central axis of the turret 20.

A pin screw 110, having a smooth-surfaced cylindrical portion 112 with a diameter slightly less than the diameter of the bore 104 of the sleeve 102 and an outer threaded portion 114, is inserted through the sleeve bore 104 of the receptacle 100 and then the threaded portion 114 is firmly tightened into the threaded bore 106 of the support stud 98. In such manner the receptacle 100 is pivotally coupled to the support stud 98. The bottom edge of the receptacle 100, opposite to that edge which is connected to the sleeve 102, then rests on the protruding element 108 of the support stud 98 when the receptacle 100 is positioned upright as shown in FIG. 4.

A slug-like weight element 116 is integrally formed with, welded to, or otherwise secured to, the side of the receptacle 100 which is contiguous with, and parallel to, that bottom edge of the receptacle 100 to which the sleeve 102 is connected. The slug element 116 is of a weight sufficient in relation to the weight of the remaining portions of the receptacle 100 such that after the receptacle 100 has been pivotally tilted, in a counter-clockwise direction as shown in FIG. 4, through an angular displacement of approximately 30°, the weight of the slug element 116 overbalances the weight of the remaining portions of the receptacle 100 and causes the receptacle 100 to pivot, instantaneously in an accelerating manner, to its completely inverted position, as shown in FIG. 5. A lid 118 is preferably hinged to a top edge of the receptacle 100, in the manner shown in FIGS. 3 and 4, such that the pivotal inverting movement of the receptacle 100 causes the lid 118 to swing away from the open end of the receptacle 100, as shown in FIG. 5, and thereby allow the material contained therein to readily flow from the inverted receptacle 100.

The recptacle 100 also has a finger element 120 offset and depending downwardly therefrom when the receptacle 100 is viewed in its upright position as shown in FIGS. 3 and 4. The purpose of the finger element 120 will be explained hereinafter in connection with the description of the operation of the dispensing apparatus 10.

FIG. 6 illustrates an alternative embodiment of the receptacle 100 wherein its capacity has been multiplied approximately three times by clipping other box-shaped receptacles 122 onto the original receptacle 100.

FIG. 7 illustrates the means by which the height of the turret 20 may be extended above the base plate 15 of the dispensing apparatus 10. An extension column 124 is inserted between, and respectively mated with, the vertical shaft 16 and the vertical column 22.

As shown in FIGS. 1 and 2, the dispensing apparatus 10 is positioned for operation adjacent to an animal enclosure 126, for instance, a water-filled fish tank.

The drive mechanism 46 of the dispensing apparatus 10 may take the form of a one-fortieth to one-quarter horsepower electric motor in the preferred embodiment of the apparatus. The drive mechanism 46 is electrically energized by a suitable source of electrical power via lead chord 128. A selector dial 130 having appropriate indicia thereon may be turned to preselect the desired speed of rotation of the output drive shaft 54 of the drive mechanism 46, and, thus, of the rotatable member 44. Preferably, the drive mechanism 46 is capable of rotating the drive shaft 54 at very slow speeds, for example, an angular speed within the range of one revolution per hour to one revolution per twelve hours. A switch 132 is provided having "on" and "off" positions for turning the drive mechanism 46 on and off. A light bulb 133 will glow when the switch 132 is in its "on" position.

With the dispensing apparatus 10 in the position of FIGS. 1 and 2, the turret 20 of the rotatable member 44 will consecutively carry each of the receptacles 100 through a preselected segment of the fixed path of revolution of the receptacles 100, during which path segment the receptacle 100 will be positioned directly above the animal enclosure 126 into which the material M will be dispensed.

In the preferred embodiment of the apparatus, as illustrated in FIGS. 1 and 2, there are seven receptacles 100 mounted equi-distantly around the periphery of the turret 20 and the turret 20 is driven through one-seventh of a rotation cycle per each 24 hour period. In other words, a predetermined quantity of material M will be dispensed into the animal enclosure 126 at approximately the same time each day for seven days before all of the receptacles 100 need to be pivoted to their upright positions and refilled with material.

Prior to the actuation of the drive mechanism 46 by placing the switch 132 in its "on" position, a disc 134 mounted on the drive shaft 54 may be manually turned in order to rotate the turret 20 to preset the receptacles 100 in their desired initial angular positions with respect to the location of material dispensing into the animal enclosure 126. At such positions, the first receptacle 100 which will dispense the material M will be displaced approximately one-seventh of one rotation cycle from that location where inversion of the receptacle 100 will occur; or, in terms of time, the first receptacle 100 will be displaced approximately 24 hours away from the location where inversion of the receptacle 100 will occur.

In order to accomplish inversion of the receptacle 100, the hollow pedestal 86 is adjusted to its desired stationary position of FIGS. 1 and 2, wherein such position the bent portion 96 of the rod 92 extends perpendicularly in relation to the longitudinal axis of the column 22 and is engageable, at such position, with the depending finger element 120 of the receptacle 100 simultaneously as the receptacle 100 enters the preselected segment of its path of revolution. In this position, the bent portion 96 of the rod 92 will perform a tripping function by initiating pivotal tilting of the receptacle 100 simultaneously as the receptacle 100 is carried along the preselected segment away from the bent portion 92. After the receptacle 100 has been pivotally tilted through a predetermined angular displacement, for example, thirty degrees, the weight of the slug element 116 overbalances the weight of the remaining portions of the receptacle 100 and causes the finger element 120 to disengage from the bent portion of the rod 92 as the receptacle 100 pivots, instantaneously in an accelerating manner, to its completely inverted position, as shown in FIGS. 1 and 2. Simultaneously as the receptacle 100 inverts, the lid 118 swings away from the open end of the receptacle 100 and the material M contained therein dispenses therefrom at the end of the preselected path segment, which also is the end of the preselected time period, i.e., 24 hours.

Consecutively, each of the remaining six receptacles 100 will move through the preselected path segment and dispense a predetermined quantity of material M at the end of the path segment during consecutive subsequent 24 hour time periods.

It is thought that the invention and many of its attendant advantages will be understood from the foregoing description and it will be apparent that various changes may be made in the form, construction and arrangement of the parts and that changes may be made in the form, construction and arrangement of the apparatus described without departing from the spirit and scope of the invention or sacrificing all of its material advantages, the form hereinbefore described being merely a preferred embodiment thereof.

I claim:

1. In an apparatus for dispensing a predetermined quantity of material at the end of a preselected time period, the combination comprising:
   a receptacle for containing a predetermined quantity of material;
   a rotatable member for carrying said receptacle along a substantially horizontal fixed path of travel, said receptacle being pivotally coupled to said rotatable member at one location on said receptacle offset from the center of gravity of said receptacle with said material being contained therein and being rested upon said rotatable member in an upright position at another location on said receptacle offset from said center of gravity in an opposite relation to said one location, said receptacle capable of being pivotally moved from said upright position to an inverted position, said receptacle having a finger element depending downwardly therefrom when said receptacle is disposed in its upright position;
   drive means for rotating said rotatable member about a substantially vertical axis and through at least that portion of one rotation cycle which corresponds to a preselected time period; and
   a trip element disposed in a stationary position downwardly from said locations on said receptacle at which said receptacle is coupled to, and rested upon, said rotatable member, and aligned across a horizontal fixed path of travel of said finger element of said receptacle, said trip element engageable with said finger element of said receptacle for initiating pivotal tilting movement of said receptacle from its upright position simultaneously as said receptacle is being carried along a segment of its fixed path of travel by said rotatable member during said preselected time period but before said rotatable member has carried said receptacle completely through said portion of one rotation cycle and before the end of said preselected time period, said trip element disengageable from said finger element when the pivotal tilting movement of said receptacle caused by said trip element has concurrently moved said center of gravity across said one location on said receptacle whereby, upon disengagement of said trip element from said finger element, said receptacle continues unaided pivotal movement to its inverted position to thereby dispense the predetermined quantity of material from said receptacle at the end of said portion of one rotation cycle and of said preselected time period.

2. In an apparatus for dispensing a predetermined quantity of material at the end of a preselected time period, the combination according to claim 1, wherein said receptacle is pivotally invertably movable in a plane which is substantially perpendicular to the horizontal plane of said fixed path of travel of said receptacle.

3. In an apparatus for dispensing a predetermined quantity of material at the end of a preselected time period, the combination according to claim 1, wherein:
   said rotatable member includes
      rotatable shaft means, and
      a disc element carried on said shaft means, said disc element being immovable in relation to said shaft means in the plane of rotation of said shaft means such that said shaft means and said disc element are rotatable together, said disc element being pivotally movable in relation to said shaft means in a direction that is parallel to the axis of said shaft means which allows for pivotal movement of said disc element in said direction about said shaft means as said shaft means and said disc element are rotated together; and said drive means for rotating said rotatable member includes
rotatable drive shaft means,
a wheel element fixed to said shaft means, and
a biased member for pivotally moving said disc element in relation to said rotatable shaft means which carries said disc element to provide pressurized frictional contact between said disc element and said wheel element so as to prevent slippage between said elements as said drive shaft means rotatably drives said rotatable member via the frictional contact between said elements and to insure rotation of said rotatable member through said portion of one rotation cycle during the preselected time period as said drive shaft means rotatably drives said rotatable member.

4. In an apparatus for dispensing a predetermined quantity of material at the end of a preselected time period, the combination according to claim 1, wherein:
said trip element is adjustably movable in order to preposition said trip element at any desired stationary position along said fixed path of travel of said finger element of said receptacle.

5. In an apparatus for dispensing a predetermined quantity of material at the end of a preselected time period, the combination according to claim 1 further comprising:
means for accelerating the pivotal tilting movement of said receptacle to disengage said receptacle from said trip element and cause inverting of said receptacle to thereby facilitate dispensing of the predetermined quantity of material from said receptacle at the end of the preselected time period.

6. In an apparatus for dispensing a predetermined quantity of material at the end of a preselected time period, the combination according to claim 5, wherein said means for accelerating the pivotal tilting movement of said receptacle comprises a weight element attached to said receptacle.

7. In an apparatus for dispensing a predetermined quantity of material at the end of consecutive preselected time periods, the combination comprising:
a plurality of receptacles, each for containing a predetermined quantity of material;
a rotatable member for carrying said plurality of receptacles along a substantially horizontal fixed path of travel, each of said receptacles being pivotally coupled to said rotatable member at one location on said each receptacle offset from the center of gravity of said each receptacle with said material being contained therein and being rested upon said rotatable member in an upright position at another location on said each receptacle offset from said center of gravity in an opposite relation to said one location, said each receptacle capable of being pivotally moved from said upright position to an inverted position, said each receptacle having a finger element depending downwardly therefrom when said each receptacle is disposed in its upright position;
drive means for rotating said rotatable member about a substantially vertical axis and through consecutive portions of one rotation cycle which corresponds to consecutive preselected time periods; and
a trip element disposed in a stationary position downwardly from said locations on said receptacles at which said receptacles are coupled to, and rested upon, said rotatable member, and aligned across a horizontal fixed path of travel of said finger elements of said receptacles, said trip element engageable with said finger element of one of said receptacles for initiating pivotal tilting movement of said one receptacle from its upright position simultaneously as said one receptacle is being carried along a segment of said fixed path of travel of said plurality of receptacles by said rotatable member during each of said consecutive preselected time periods but before said rotatable member has carried said one receptacle completely through one of said consecutive portions of one rotation cycle and before the end of one of said consecutive preselected time periods, said trip element disengageable from said finger element of said one receptacle when the pivotal tilting movement of said one receptacle caused by said trip element has concurrently moved said center of gravity across said one location on said one receptacle whereby, upon disengagement of said trip element from said finger element, said one receptacle continues unaided pivotal movement to its inverted position to thereby dispense the predetermined quantity of material from said one receptacle at the end of each of said consecutive portions of one rotation cycle and of each of said consecutive preselected time periods.

8. In an apparatus for dispensing a predetermined quantity of material at the end of consecutive preselected time periods, the combination according to claim 7, wherein each of said plurality of receptacles is pivotally invertably movable in a plane which is substantially perpendicular to the horizontal plane of said fixed path of travel of said receptacle.

9. In an apparatus for dispensing a predetermined quantity of material at the end of consecutive preselected time periods, the combination according to claim 7, wherein:
said rotatable member includes
rotatable shaft means, and
a disc element carried on said shaft means, said disc element being immovable in relation to said shaft means in the plane of rotation of said shaft means such that said shaft means and said disc element are rotatable together, said disc element being pivotally movable in relation to said shaft means in a direction that is parallel to the axis of said shaft means which allows for pivotal movement of said disc element in said direction about said shaft means as said shaft means and said disc element are rotated together; and
said drive means for rotating said rotatable member includes
rotatable drive shaft means,
a wheel element fixed to said shaft means, and
a biased member for pivotally moving said disc element in relation to said rotatable shaft means which carries said disc element to provide pressurized frictional contact between said disc element and said wheel element so as to prevent slippage between said elements as said drive shaft means rotatably drives said rotatable member via the frictional contact between said elements and to insure rotation of said rotatable member through said consecutive portions of one rotation cycle during said consecutive preselected time periods as said drive shaft means rotatably drives said rotatable member.

10. In an apparatus for dispensing a predetermined quantity of material at the end of consecutive preselected time periods, the combination according to claim 7 wherein:

said trip element is adjustably movable in order to preposition said trip element at any desired stationary position along said fixed path of travel of said finger elements of said receptacles.

11. In an apparatus for dispensing a predetermined quantity of material at the end of consecutive preselected time periods, the combination according to claim 9 further comprising:

means for accelerating the pivotal tilting movement of said one of said plurality of receptacles to disengage said one receptacle from said trip element and cause inverting of said one receptacle to thereby facilitate dispensing of the predetermined quantity of material from said one receptacle at the end of each of said consecutive preselected time periods.

12. In an apparatus for dispensing a predetermined quantity of material at the end of consecutive preselected time periods, the combination according to claim 11, wherein said means for accelerating the pivotal tilting movement of each of said plurality of receptacles comprises a weight element attached to each of said receptacles.

* * * * *